June 19, 1945. P. R. HORNBROOK 2,378,553
CAR UNLOADER NOZZLE
Filed Oct. 20, 1943   3 Sheets-Sheet 1
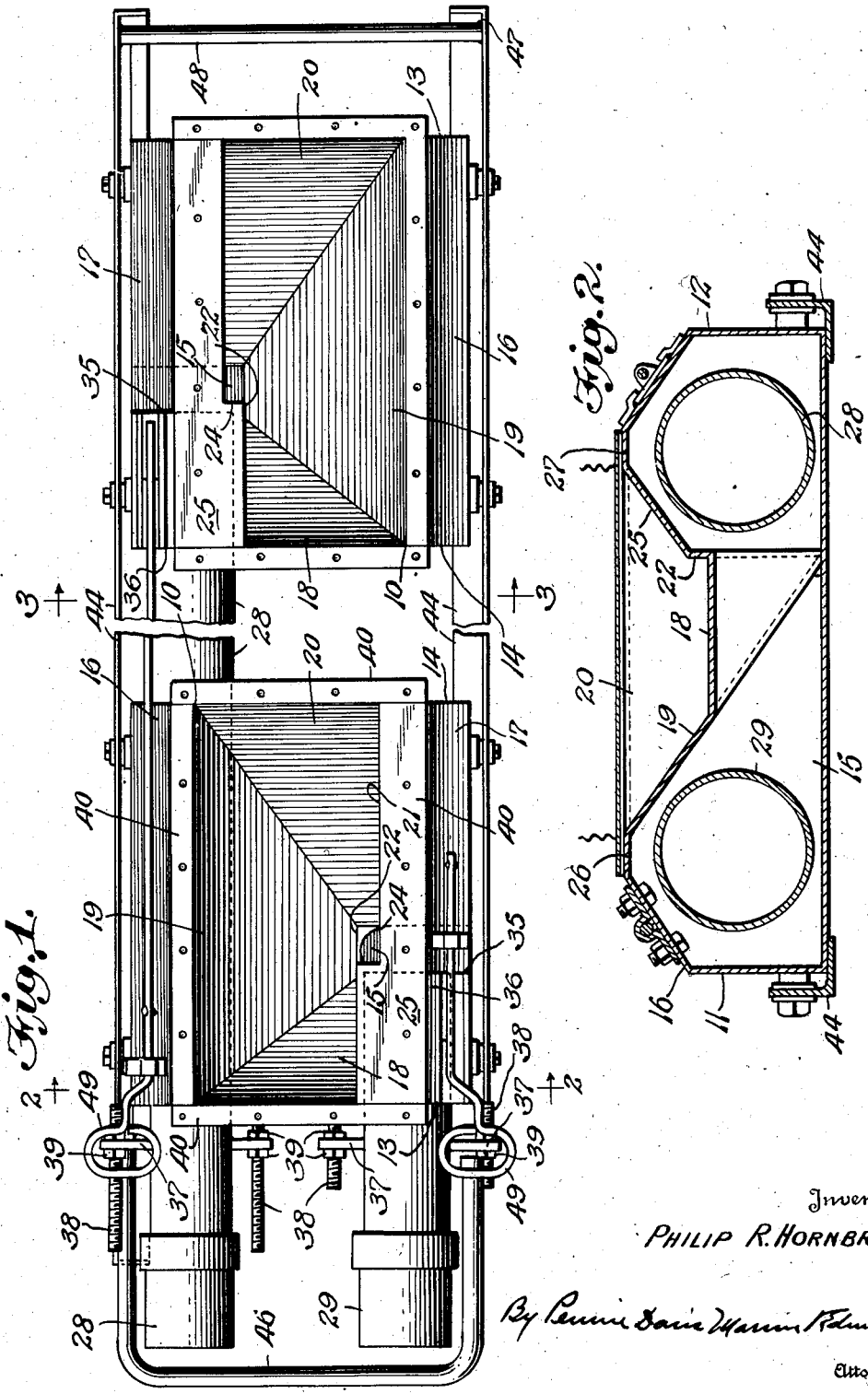
Inventor
PHILIP R. HORNBROOK.

June 19, 1945.　　P. R. HORNBROOK　　2,378,553
CAR UNLOADER NOZZLE
Filed Oct. 20, 1943　　3 Sheets-Sheet 2
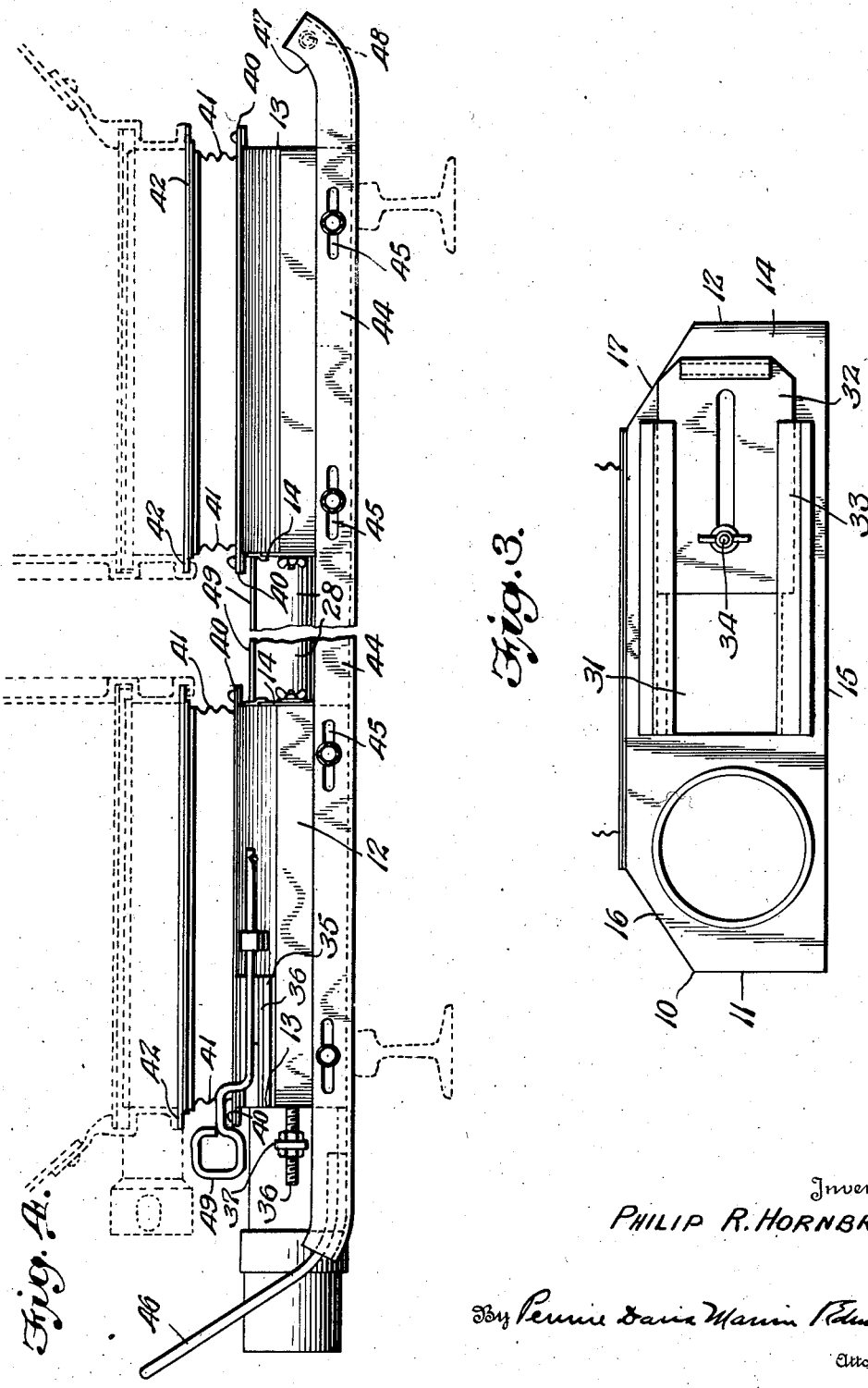
Inventor
PHILIP R. HORNBROOK.

June 19, 1945.  P. R. HORNBROOK  2,378,553
CAR UNLOADER NOZZLE
Filed Oct. 20, 1943  3 Sheets-Sheet 3
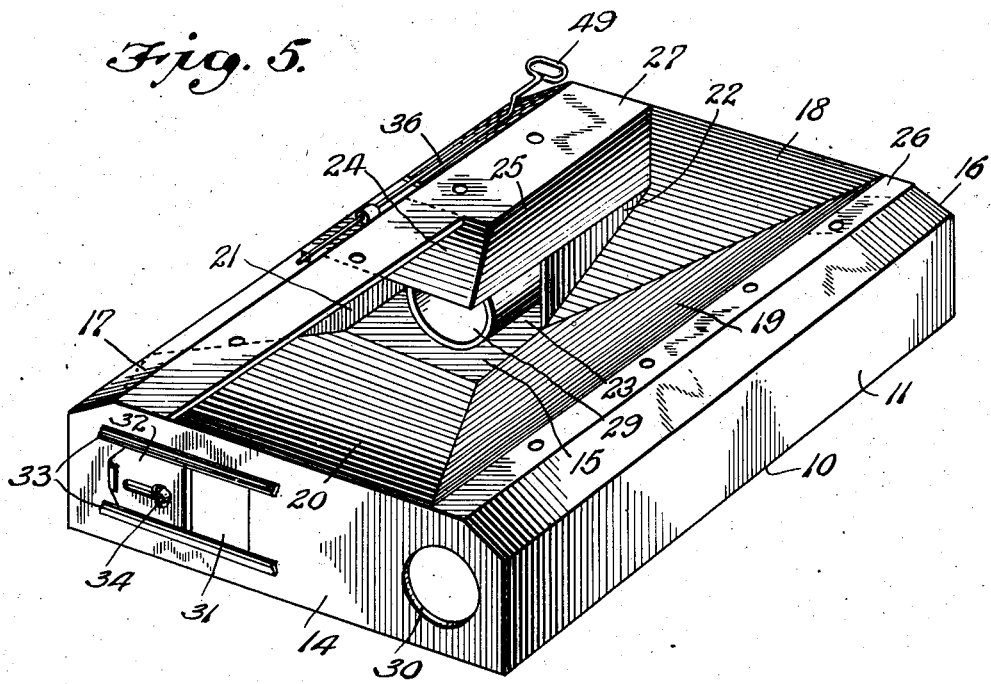
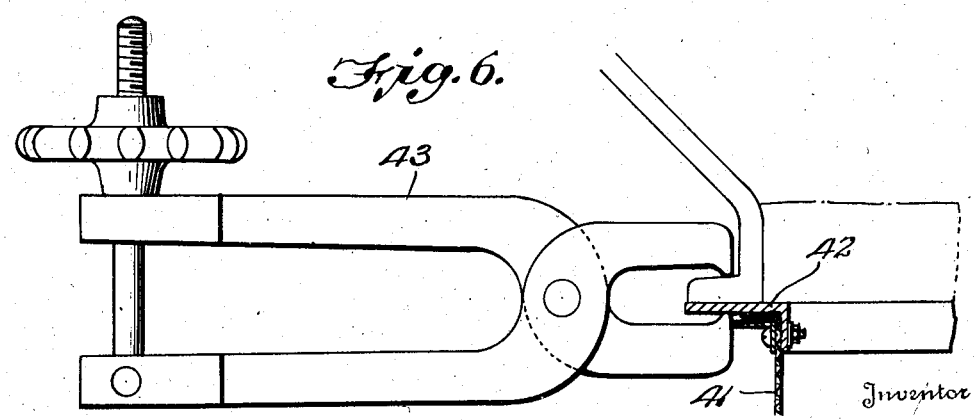
Inventor
PHILIP R. HORNBROOK.
By Pennie Davis Marvin Edmonds
Attorneys Patented June 19, 1945

2,378,553

UNITED STATES PATENT OFFICE 2,378,553

CAR UNLOADER NOZZLE

Philip R. Hornbrook, Allentown, Pa., assignor to Fuller Company, Catasauqua, Pa., a corporation of Delaware Application October 20, 1943, Serial No. 506,961

14 Claims. (Cl. 214—83)

This invention relates to apparatus for unloading hopper bottom railroad cars and the invention is concerned more particularly with a novel unloader applicable to both single and double hopper cars. The new unloader is primarily intended for use in unloading fine, pulverulent, or ground material which is capable of being entrained in an air stream and delivered through a conduit to a desired point.

In the unloading of fine material, such, for example, as silica flour, it is both wasteful and objectionable merely to dump the material, since dust clouds are raised which entail loss of the material and settling of the dust over a considerable area. Such deposited dust is unsightly, and, where machinery is involved, may cause considerable damage. Also, in confined spaces, the presence of dust of certain materials gives rise to the danger of an explosion. As it is frequently necessary to reship the material, removal of the material from cars by dumping results in a loss each time it is handled.

The present invention is directed to the provision of a novel device by which finely divided material, such as silica flour and the like, may be removed from a hopper bottom car and conveyed to a delivery point adjacent to or remote from the car without loss of the material by the formation of dust clouds, by spillage, or as a result of receptacle or storage retention. The new device is portable and it is so constructed that it may be readily attached to the car, adjusted for operation, and removed in a very short time.

The unloader of the invention comprises a body member or structure which is so formed at the top that it will fit the hopper bottom of a car and may be clamped thereto, and preferably means, such as a cloth bellows, are provided for connecting the top of the body to the lower end of the hopper to prevent escape of the material. The body includes outer side and end walls, and a bottom, and within it are inner walls, some of which converge to define a receptacle. Certain of the inner walls define an outlet chamber opening from the interior of the receptacle and a conduit extends through one of the end walls of the body into the chamber and has an open end lying near the bottom of the body. In the operation of the device, the conduit is connected to a region of subatmospheric pressure and the inrush of atmospheric air into the conduit entrains the fine material at the mouth of the conduit and conveys it through the conduit to a delivery point. Jamming of the material at the open end of the conduit is prevented by means of suitable roof and other walls and access to the interior of the receptacle to permit bridges of material to be broken up is afforded through an opening provided with a removable cover. The rate of flow of material into the conduit is controlled by admitting air into the interior of the body and the receptacle through an opening which may be shut off to the desired extent by suitable means, such as a sliding door.

The new unloader ordinarily comprises two body members mounted on a skid frame and adjustable lengthwise of the frame to permit them to be properly positioned with reference to the hoppers on a car. The use of two such members strengthens the assembly and permits the apparatus to be made of relatively light materials.

For a better understanding of the invention, reference may be had to the accompanying drawings, in which Fig. 1 is a plan view of an unloader of the invention which includes a pair of receptacles;

Fig. 2 is a sectional view on the line 2—2 of Fig. 1;

Fig. 3 is a sectional view on the line 3—3 of Fig. 1;

Fig. 4 is a view of the device in side elevation;

Fig. 5 is a view in perspective of one of the receptacles of the device with parts omitted; and Fig. 6 is a fragmentary elevational view showing a clamping means that may be employed on the device.

The device illustrated in the drawings includes a body member 10 of generally rectangular shape formed with side walls 11, 12, end walls 13, 14, and a bottom 15. Extending upwardly and inwardly from the side walls 11 and 12 are top walls 16 and 17, respectively. Within the side and end walls are downwardly convergent inner walls 18, 19, and 20 which lead to the bottom 15 and with it, define a well or receptacle. A vertical wall 21 extends upward from the bottom along one side thereof and another vertical wall 22, lying spaced from wall 21, extends upward from the sloping wall 18. The walls 21, 22 and the bottom 15 in part define an outlet chamber 23 open at one end to the interior of the receptacle and at the other to the space beneath walls 18, 19, and 20. Entrance into the outlet chamber directly from above is restricted by downwardly extending walls 24 and 25 which lie, respectively, generally at right angles and parallel to wall 22.

The sloping top wall 16 is connected to the sloping inner wall 19 by a flat top wall 26 and a similar flat top wall 27 extends inwardly from the upper edge of the sloping top wall 17. Walls 24 and 25 extend downward from the flat top wall 27.

The apparatus disclosed includes two rectangular bodies of the construction described and they lie end to end and with their wells or receptacles in reversed relation so that the portions of their bottom walls 15 exposed from above lie at opposite sides thereof.

The material in the hoppers which enters the wells or receptacles and the outlet chambers 23 thereof is withdrawn through conduits 28 and 29.

Conduit 28 extends through openings 30 in the end walls 13, 14 of one body and through an opening in wall 14 of the second body. The end of the conduit lies in the outlet chamber 23 of the second receptacle close to the bottom 15 thereof. The other conduit 29 extends through an opening in the end wall 13 of the first body to terminate within the outlet chamber thereof. The conduits fit closely in the openings through the end walls of the bodies.

The end wall 14 of each body is provided with an opening 31 for admission of air into the space within the body beneath the convergent walls 18, 19, and 20. Air entering this space may flow into the outlet chamber 23 around the outside of the conduit therein and the flow of air is controlled by an adjustable door 32 slidable in guides 33 along the sides of opening 31, the door being held in any desired position by suitable locking means, indicated at 34. A blast opening 35 is formed in the sloping top wall 17 of each body and by opening the door, air may be introduced into the receptacle to dislodge material which has bridged over and does not flow. The opening 35 is normally closed by a door 36 slidable in suitable guides by means of a handle 49.

Conduits 28 and 29 are connected to a region of reduced pressure so that, in the operation of the device, atmospheric air will enter the ends of the conduits and entrain material which will then be carried out through the conduits. Each conduit is provided with lugs 37 through which pass adjustment screws 38 provided with nuts 39 and bearing against the adjacent wall 13 of one of the bodies. These parts permit endwise adjustment of the conduits to place their intake ends in proper position within the outlet chambers 23.

A flange 40 extends around the upper edge of each body and serves for strengthening purposes and also as a means for attaching one end of a cloth bellows to the body. The other end of the bellows is provided with a metal frame 42 which may be clamped to the bottom flange of the car hopper by suitable clamps, one of which is illustrated at 43 in Fig. 6.

The bodies 10 are secured between a pair of skids 44 by bolts passing through slots 45 in the skids. The skids are long enough to span the rails of a track of standard gauge and the slot and bolt connection of the bodies to the skids permits adjustment of the bodies on the skids, as may be necessary in the use of the device with cars of different constructions. At one end of the apparatus, the skids are connected by a handle 46 and the other ends of the skids are curved upwardly and connected by a cross-bar 48.

In the use of the unloader, it is slid transversely under the car until one of the bodies 10 is properly disposed beneath one of the car hoppers. The frame 42 at the free end of the bellows of the body is then clamped to the hopper flange to make a tight joint. If the second body 10 is not in proper position beneath the other hopper of the car, that body is adjusted to the correct position on the skid frame and its bellows is connected to the hopper flange. The conduits 28 and 29 are next connected to a region of subatmospheric pressure, as by conduits leading to receivers being exhausted. When these connections have been made, the hoppers are opened and the material from the car drops into the receptacles in the bodies and enters the outlet chambers 23. The door 32 in each body is then opened to permit air to enter the outlet chamber of the body and the air enters the open ends of conduits 28, 29 entraining with it the finely divided material discharged into the body. By adjusting the size of the openings 31 and the positions of the open ends of the conduits within their outlet chambers the best conveying conditions are obtained, and as the material is carried away from the receptacles, more material is discharged into them from the hoppers. Should the material at any time bridge over or fail to flow properly in a receptacle, the handle 49 controlling the door of the blast opening of the body is moved back and forth a few times to admit blasts of air which will break the bridged material.

By the use of the new apparatus, a hopper car can be emptied quickly without dust clouds, spillage, retention of the material in the car, danger of explosion, or unnecessary handling. The device can be quickly placed in position and connected to the car, and also quickly removed, and when in position, the device can be made ready for conveying with little adjustments of the parts.

I claim:

1. Mechanism for unloading fine material from a hopper-bottom car comprising a body member having a well extending from the upper side thereof, said body member being adapted to be so connected to a hopper bottom that the well therein will receive material directly as it flows from the hopper, said body also having an opening adjacent the bottom of said well, means within the well shielding said opening, and a conduit adapted to be connected to a source of reduced pressure and having an open end adjacent the opening in the well.

2. Mechanism for unloading fine material from a hopper-bottom car comprising a body member having a well extending from the upper side thereof, said body member being adapted to be so connected to a hopper bottom that the well therein will receive material directly as it flows from the hopper, said body also having an opening adjacent the bottom of said well, means within the well shielding said opening, said body member having a passage for air thereinto, and valve means to control the flow of atmospheric air through said passage and into said conduit.

3. Mechanism for unloading fine material from a hopper-bottom car comprising a body member having a well extending from the upper side thereof, said body member being adapted to be so connected to a hopper bottom that the well therein will receive material directly as it flows from the hopper, said body also having an opening adjacent the bottom of said well, means within the well shielding said opening, a conduit adapted to be connected to a source of reduced pressure and having an open end extending into said well, a passage for atmospheric air into said body member, and valve means carried by the body member for adjustably controlling the flow of air through said passage, whereby the flow of air into the open end of the conduit is controlled.

4. Mechanism for unloading fine material from a hopper-bottom car comprising a body member having a well extending from the upper side thereof, said body member being adapted to be so connected to a hopper bottom that the well therein will receive material directly as it flows from the hopper, said body also having an opening adjacent the bottom of said well, means within the well shielding said opening, a conduit adapted to be connected to a source of reduced pressure and having an open end extending into said well, a passage for atmospheric air into said body member, and means for suddenly and intermittently augmenting the flow of air into the open end of said conduit.

5. Mechanism for unloading fine material from a hopper-bottom car comprising a body member having a well extending from the upper side thereof, said body member being adapted to be so connected to a hopper bottom that the well therein will receive material directly as it flows from the hopper, said body also having an opening adjacent the bottom of said well, means within the well shielding said opening, a conduit adapted to be connected to a source of reduced pressure having an open end extending into said well, means for adjusting the position of the open end of said conduit relative to the opening adjacent the bottom of the well, and means for controlling the flow of atmospheric air through said conduit.

6. Mechanism for unloading fine material from a hopper-bottom car comprising a body member having a well extending from the upper side thereof, said body member being adapted to be so connected to a hopper bottom that the well therein will receive material directly as it flows from the hopper, said body also having an opening adjacent the bottom of said well, means within the well shielding said opening, flexible means attached to said body member around its upper edge portion and adapted to be connected to a hopper bottom, whereby a substantially dust-proof connection may be made between said body member and a hopper bottom.

7. In means for unloading fine material from a hopper bottom car, a hollow rectangular body member having a depressed portion on its upper side formed by downwardly and inwardly sloping walls, the upper surface of said body member having an opening therein adjacent the juncture of said inwardly sloping walls, a shielding housing built around a portion of said opening, a conduit entering one end of said body member and having an end closely adjacent said opening, and a controlled air inlet at the opposite end of said body member for the admission of a desired quantity of air to said conduit to entrain said fine material.

8. The combination set forth in claim 7, adjusting means associated with said conduit and said body member and arranged to adjust the relative position of an end of said conduit and the opening in said depressed portion whereby to maximize the entraining of said material.

9. The combination set forth in claim 7, means for moving said conduit longitudinally of said body member and adjusting its position relative to the opening in said cavity and flexible sheeting means attached to the upper periphery of the cavity in said body member and constructed to make a relatively dust proof connection between said body member and a hopper bottom.

10. In means for unloading fine material from a hopper bottom, two spaced skids of a length greater than standard rail gauge, each of said skids having a handle portion at one end and the opposite end upturned, a body member permanently mounted on said skids and having a well extending from the upper side thereof and an opening adjacent the bottom of said well, a conduit adapted to be connected to a source of reduced pressure and having an open end adjacent the opening in said well, and means to control the flow of atmospheric air to said conduit.

11. The combination set forth in claim 10, means within the well shielding said opening and assuring an even flow of material therethrough.

12. Mechanism for unloading fine material from a hopper-bottom car comprising two spaced skids of a length greater than standard rail gauge, each of said skids having a handle portion at one end and the opposite end upturned, two body members permanently mounted on said skids, each having a well extending from the upper side thereof and an opening adjacent the bottom of the well therein, a conduit for each body member adapted to be connected to a source of reduced pressure, each conduit having an open end adjacent the opening in the well of one of said body members, means to control the flow of atmospheric air to the open end of each conduit, and means adjustably connecting said body members whereby the distance between the two body members readily can be adjusted.

13. Mechanism for unloading fine material from a hopper-bottom car comprising two spaced skids of a length greater than standard rail gauge, each of said skids having a handle portion at one end and the opposite end upturned, two body members permanently mounted on said skids, each of said body members having a well extending from the upper side thereof and an opening adjacent the bottom of the well therein, a conduit adapted to be connected to a source of reduced pressure and having an open end adjacent the opening in the well of one of said body members, a second conduit supported by one of said body members having an open end adjacent the opening in the well of the other body member, means for controlling the flow of atmospheric air to both of said conduits, and adjusting means mounted on said one of the body members for moving both conduits, independently, longitudinally of said body members and adjusting their respective positions relative to the openings in the respective wells of the body members.

14. Mechanism for unloading fine material from a hopper-bottom car comprising two spaced skids of a length greater than standard rail gauge, each of said skids having a handle portion at one end and the opposite end upturned, two body members permanently mounted on said skids, each of said body members having a well extending from the upper side thereof and an opening adjacent the bottom of the well therein, two conduits, each adapted to be connected to a source of reduced pressure, and each having an open end adjacent the opening in the well of one of said body members, means to control the flow of atmospheric air to said conduits, said skids having slots making one of said body members relatively movable so that they may be spaced from one another a distance suitable to cause both of them to be properly and simultaneously positioned beneath the discharge openings of a hopper-bottom rail car, both of said body members cooperating, through their spaced relation and their connection with the skids, to reinforce and brace the skid assembly, whereby the whole may be made light in weight and readily portable.

PHILIP R. HORNBROOK.